United States Patent
Jiang

(10) Patent No.: US 7,436,795 B2
(45) Date of Patent: Oct. 14, 2008

(54) TIMER BASED STALL AVOIDANCE MECHANISM FOR HIGH SPEED WIRELESS COMMUNICATION SYSTEM

(75) Inventor: Sam Shiaw-Shiang Jiang, Hsinchu (TW)

(73) Assignee: Innovative Sonic Limited, Road Town, Tortola (VG)

( * ) Notice: Subject to any disclaimer, the term of this patent is extended or adjusted under 35 U.S.C. 154(b) by 1427 days.

(21) Appl. No.: 10/314,539

(22) Filed: Dec. 9, 2002

(65) Prior Publication Data

US 2003/0123403 A1 Jul. 3, 2003

Related U.S. Application Data

(60) Provisional application No. 60/345,676, filed on Jan. 3, 2002.

(51) Int. Cl.
 *H04Q 7/00* (2006.01)

(52) U.S. Cl. ............... 370/328; 370/236; 370/394; 370/349; 370/389; 370/235; 370/392; 370/252; 709/236; 709/221; 709/235; 714/748; 714/752

(58) Field of Classification Search ............ 370/328, 370/394, 349, 329, 389, 235, 392, 278, 236, 370/336

See application file for complete search history.

(56) References Cited

U.S. PATENT DOCUMENTS

| | | | | |
|---|---|---|---|---|
| 6,401,127 B1 * | 6/2002 | Lei et al. | ............... | 709/235 |
| 6,424,625 B1 * | 7/2002 | Larsson et al. | ............... | 370/236 |
| 6,519,223 B1 * | 2/2003 | Wager et al. | ............... | 370/216 |
| 6,643,272 B1 * | 11/2003 | Moon et al. | ............... | 370/311 |
| 6,687,227 B1 * | 2/2004 | Li et al. | ............... | 370/231 |
| 6,697,347 B2 * | 2/2004 | Ostman et al. | ............... | 370/335 |
| 6,697,986 B2 * | 2/2004 | Kim et al. | ............... | 714/751 |
| 6,697,988 B2 * | 2/2004 | Kim et al. | ............... | 714/752 |
| 6,700,867 B2 * | 3/2004 | Classon et al. | ............... | 370/216 |
| 6,754,228 B1 * | 6/2004 | Ludwig | ............... | 370/468 |
| 6,765,885 B2 * | 7/2004 | Jiang et al. | ............... | 370/328 |
| 6,798,842 B2 * | 9/2004 | Jiang | ............... | 375/295 |

(Continued)

FOREIGN PATENT DOCUMENTS

JP 11-88466 3/1999

(Continued)

OTHER PUBLICATIONS

3rd Generation Partnership Project, Technical Specification Group High Speed Downlink (HSDPA) Overall description, Stage 2 (Release 5).

(Continued)

*Primary Examiner*—Marceau Milord
(74) *Attorney, Agent, or Firm*—Winston Hsu

(57) ABSTRACT

This invention uses timers at the transmitter to track its sending data blocks to improve the timer-based stall avoidance mechanism of the prior art. Moreover, the invention uses a multi-timer mechanism to manage reordering buffers at the receiver. The multi-timer mechanism provides the receiver with one timer per reorder buffer, or uses one timer per missing data block, or uses one timer per missing data block but a gap of consecutive TSN missing data blocks can share one timer. The multi-timer mechanism can effectively track the missing blocks and monitor the reorder delivery process for all reordering buffers.

8 Claims, 3 Drawing Sheets

| TSN | 0 | 1 | 2 | 3 | 4 | 5 | 6 | 7 | 8 |
|---|---|---|---|---|---|---|---|---|---|
| Receiving status | X | X | X | V | V | V | V | X | V |

U.S. PATENT DOCUMENTS

| | | | | |
|---|---|---|---|---|
| 6,907,005 | B1* | 6/2005 | Dahlman et al. | 370/236 |
| 6,920,152 | B1* | 7/2005 | Chang et al. | 370/474 |
| 6,958,997 | B1* | 10/2005 | Bolton | 370/392 |
| 7,000,021 | B1* | 2/2006 | Radhakrishnan et al. | 709/230 |
| 7,020,083 | B2* | 3/2006 | Garcia-Luna-Aceves et al. | 370/230 |
| 7,035,214 | B1* | 4/2006 | Seddigh et al. | 370/231 |
| 7,054,316 | B2* | 5/2006 | Cheng et al. | 370/394 |
| 7,061,913 | B1* | 6/2006 | Abrol et al. | 370/394 |
| 7,103,025 | B1* | 9/2006 | Choksi | 370/335 |
| 2002/0159410 | A1* | 10/2002 | Odenwalder et al. | 370/329 |
| 2003/0081664 | A1* | 5/2003 | Lu et al. | 375/222 |
| 2003/0191844 | A1* | 10/2003 | Meyer et al. | 709/227 |

FOREIGN PATENT DOCUMENTS

| | | |
|---|---|---|
| WO | WO 00/60799 | 10/2000 |

OTHER PUBLICATIONS

3$^{rd}$ Generation Partnership Project; TSG-RAM WG2 meeting #24 Oct. 22-26, 2001 HARQ Stall Avoidance (R2-012330).

* cited by examiner

| TSN | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Receiving status | V | V | V | X | V | X | V | V | | | | | | | | |

Figure 2

| TSN | 0 | 1 | 2 | 3 | 4 | 5 | 6 | 7 | 8 |
|---|---|---|---|---|---|---|---|---|---|
| Receiving status | X | X | X | V | V | V | V | X | V |

Figure 3

| TSN | 0 | 1 | 2 | 3 | 4 | 5 |
|---|---|---|---|---|---|---|
| Receiving status | X | V | V | V | X | V |

Figure 4

TIMER BASED STALL AVOIDANCE MECHANISM FOR HIGH SPEED WIRELESS COMMUNICATION SYSTEM

CROSS REFERENCE APPLICATION

This application claims priority from U.S. Provisional Patent Application No. 60/345,676 filed on Jan. 3, 2002.

BACKGROUND

In a wireless communication system, a High Speed Downlink Packet Access (HSDPA) process uses adaptive modulation, hybrid ARQ (Automatic Repeat Request) and other techniques to achieve high throughput, reduce delay and achieve high peak rates between UTRAN (Universal Terrestrial Radio Access Networks) and UEs (User Equipment). It relies on a new transport channel, the HS-DSCH (High Speed Downlink Shared Channel), to perform data exchange for the HSDPA process.

The new functionality of hybrid ARQ and HSDPA are included in the new entity called MAC-hs (MAC used for high speed) in the MAC (Medium Access Control) layer. The MAC-hs, as shown in FIGS. 1A and 1B, supports priority handling by allowing different priority classes in the same transport channel and by using transmission sequence number (TSN) to track in-sequence delivery of receiving data blocks within a priority class at the UE. Reordering buffer for each priority classes are used for support in-sequence delivery.

At one end of the HSDPA, the UTRAN uses a scheduler to schedule all UEs within a cell. The scheduler determines the HARQ Entity (one per UE) and the priority class queues to be served and schedules new transmissions and retransmission accordingly. A new transmission can be initiated on an HARQ process at any time. The UTRAN uses the HARQ Entity to set the priority class identifier based on priority class of the queue being serviced. It also increments TSN for each new data block within the same HS-DSCH and priority class. TSN is initiated at value 0. The HARQ also processes the status report from the UE, which includes ACK/NACK from the receiver and passes all status to the scheduler.

At the other end of the HSDPA, the UE uses three functional units, shown in FIG. 1C, to support the HARQ protocol. First, HARQ Entity processes HARQ process identifiers. It allocates received data blocks to different HARQ processes based on the HARQ process identifiers. Second, HARQ process will process new data indicator, do error detection processing, and transmit status reports. Last, there is one reordering entity for each priority class and transport channel configured at the UE. It inserts received data blocks to its appropriate position in the queue according to its TSN. If the received data block is the next to be delivered to higher layer, all data blocks with consecutive TSNs up to the first not received data block are delivered to higher layer.

Therefore, the UE provides in-sequence delivery to higher layers by storing the correctly received data blocks in reordering buffers first before the delivery to upper layers. Logically, one buffer per priority class is needed to provide in-sequence delivery per priority class. The data blocks are delivered to higher layers in-sequence, i.e. a data block with TSN (transmission sequence number)=SN is only delivered to higher layers when all data blocks with TSN up to and including SN-1 has been received correctly. When a data block with low sequence number in the buffer is missing (i.e. not yet correctly received), all received data blocks with higher TSN are kept in the reordering buffer. The principle is shown in FIG. 2. The data blocks 0,1,2 are correctly received and are immediately delivered to higher layer. The data blocks 4,6,7 are stored in the reordering buffer because the data block 3 is missing.

On the whole, several conditions can cause a data block missed during the transmission: (1) NACK is detected as an ACK. In a normal condition, UTRAN transmits a data block, the UE will return an ACK if received the data block correctly, otherwise, the UE will return a NACK. However, an error might happen during transmission process of the acknowledgement and the UTRAN may mistake a NACK as an ACK. Therefore, in this situation, instead of retransmission the particular buffered data block, the UTRAN discards the data block. The UTRAN starts afresh with new data in the HARQ process. Retransmission is left up to higher layers. (2) The retransmission of a data block is interrupted due to that the number of transmissions of the particular data block reaches a predefined maximum number or that there exist data with higher priority class. In this case, the UTRAN may optionally resume retransmission of the data block at a later time or start a transmission of a new data block and discard the interrupted data block. (3) Because a CRC error on the HS-SCCH is detected, the UE will neither receive data nor send status report out. Upon detecting the absence of the status report, the UTRAN will retransmit the block. (4) The receiver can not correctly encode a data block and return a NACK back to the transmitter. A retransmission is expected in this case.

Indeed, case (3) and case (4) discussed above often cause some data block retransmission, in turn, cause gaps existing in the received TSNs. In these cases, the reordering entity can maintain the received data blocks in the reordering buffer until all data blocks with lower TSN have been received.

However, when case (1) and case (2) discussed above happen, the missing data blocks are permanently lost or will not be received in a foreseeable time. In these situations, a missing data block will not be received, nor it may be received much later. If no special mechanism is introduced in the reordering entity, the protocol is stalled, and many correctly received data blocks will not be delivered to higher layer due to missing data block below in the same reorder buffer.

Therefore, using stall avoidance mechanisms in the reordering buffer is necessary to avoid stalling of the protocol. The mechanism can be based on timers, transmitter/receiver windows or a combination of these. In the prior art, a timer based stall avoidance mechanism, having only one upper layer configured timer T1 for the control of the stall avoidance of the UE reordering buffer, is described as following: If no timer T1 is active, the timer T1 is started when a data block with TSN=SN is correctly received but can not be delivered to higher layer due to that a data block with lower TSN is missing. If a timer T1 is already active no additional timer can be started, i.e. maximum one timer T1 can be active at a given time. The timer T1 is stopped if the data block for which the timer was started can be delivered to higher layer before the timer expires.

When the timer expires, all data blocks up to and including TSN-1 will be removed from the reordering buffer. In addition, all data blocks up to the first missing data block shall be delivered to higher layer. When the timer T1 is stopped or expires, and there still exist some received data blocks that can not be delivered to higher layer, the timer T1 is started for the data block with lowest TSN among those data blocks that can not be delivered.

All in all, at least two potential drawbacks exist in the above-discussed timer-based mechanism. (1) Inefficient timer cascade procedure might degrade data transmission latency; and (2) Ambiguity problem due to the modulus nature of finite-bit-length TSN (transmission sequence number) might happen so that the in-sequence delivery requirement is not fulfilled and upper layer protocol error is induced.

Next, refer to FIG. 3. If TSN=0 and 7 had been discarded by the transmitter because the return NACKs from the receiver have been mistaken for ACKs due to communication error. At the receiver, the timer will be activated first for the gap of TSN=0, 1, 2. Before the timer expires, data blocks of TSN=1 and 2 were received. Thus, when the timer expires, TSN=0 is discarded and TSN=1 up to 6 are delivered to upper layers. Then, the timer will be activated again for the gap of TSN=7. The latencies for TSN=8 are degraded because of the cascaded timer procedure.

Again, refer to FIG. 4. A 4 bits TSN is used. The receiver receives data blocks with TSN=1, 2, 3, and 5 with two gaps at TSN=0 and TSN=4. When timer expires, the first gap TSN=0 (the first zero TSN) is removed from the reordering buffer while three data blocks, TSN=1, 2, and 3, are delivered to upper layer to meet in-sequence delivery requirement. The receiver is now expecting to receive a plurality of sequential TSN data blocks, such as TSN=4, 6, 7, 8 . . . 14, 15, 0, 1, 2 and so on. Note that the expected TSN =0 (the second zero TSN) is different from the removed first zero previously.

Now, if the first zero TSN is retransmitted by the transmitter and received by the receiver, based on the prior art mechanism, the receiver will mistakenly confuse this newly arrived first zero TSN as the zero TSN of the second TSN cycle. After the timer for gap TSN=4 times out or after TSN=4 data block is received, and after TSN=6 up to 15 are also received, the out of date TSN=0 data block will be delivered to upper layer. In this situation, the data blocks are, in fact, delivered to upper layer out of sequence and will cause an upper layer protocol error.

SUMMARY

The one timer based stall avoidance mechanism of prior art has several inherited weaknesses. This invention provides solutions to fix these weaknesses. This invention uses a plurality of timers at the transmitter to track all transmitting data block to improve the timer-based stall avoidance mechanism. Moreover, because the increasing of processor power and falling cost of memory, instead of using only one timer sharing by all reordering buffers at the receiver as the prior art proposed, it is feasible to increase system performance by using more than one timer to manage reordering buffers in the receiver. Whether this invention provides the receiver with one timer per reorder buffer, or uses one timer per missing data block, or uses one timer per missing data block but a gap of consecutive TSN missing data blocks can share one timer, the multi timers mechanism improves the system performance by effectively tracking the missing blocks and monitoring the reorder delivery process.

BRIEF DESCRIPTION OF THE DRAWINGS

Following drawings with reference numbers and exemplary embodiments are referenced for explanation purpose.

FIG. 2 illustrates a 4-bit reordering buffer where data blocks TSN=0, 1, 2, 4, 6 and 7 are received and the rest of the reordering buffer is empty;

FIG. 3 illustrates a 3-bit reordering buffer where data blocks TSN=3, 4, 5, 6 and 8 are received and the rest of the reordering buffer is empty;

FIG. 4 illustrates a reordering buffer where data blocks TSN=1, 2, 3 and 5 are received and the rest of the reordering buffer is empty.

DETAILED DESCRIPTION OF THE INVENTION

Figure 1:
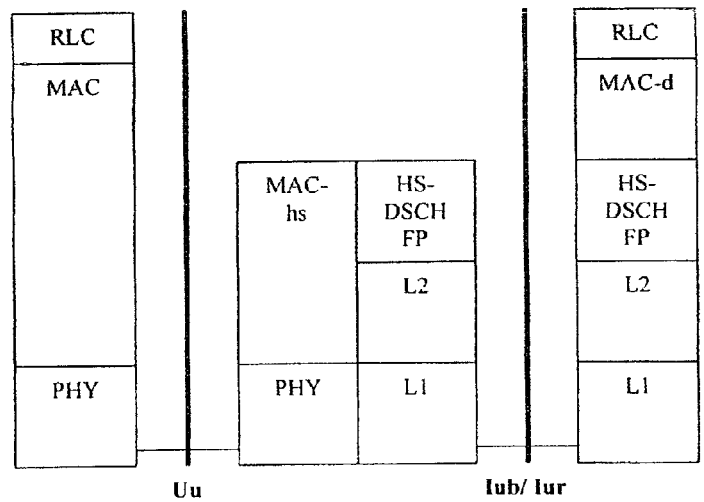
FIG. 1A illustrates radio interface protocol architecture of HSDPA, configuration with MAC-sh.
FIG. 1B illustrates radio interface protocol architecture of HSDPA, configuration without MAC-sh.
FIG. 1C illustrates the block diagram of the UE side MAC-hs architecture.
Figure 1:
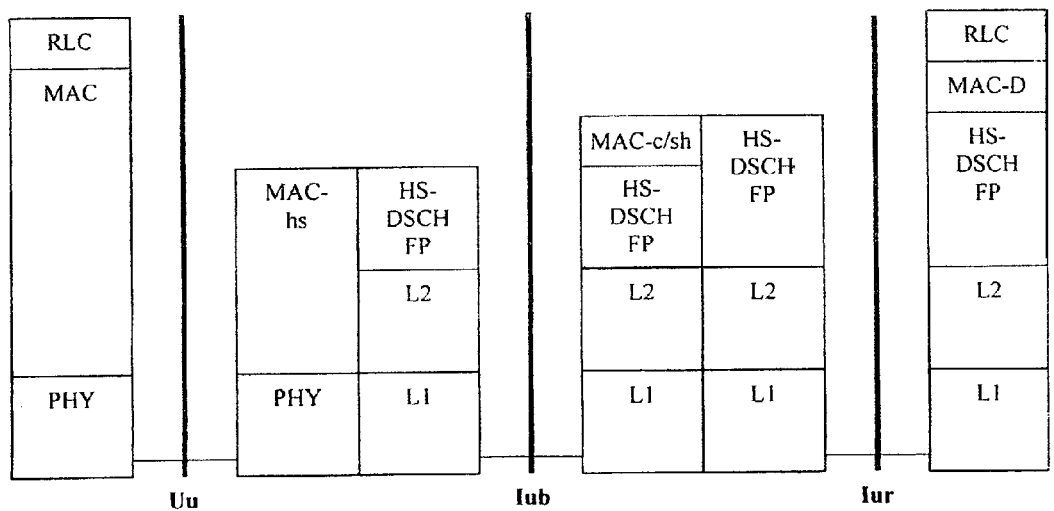
Figure 1C:
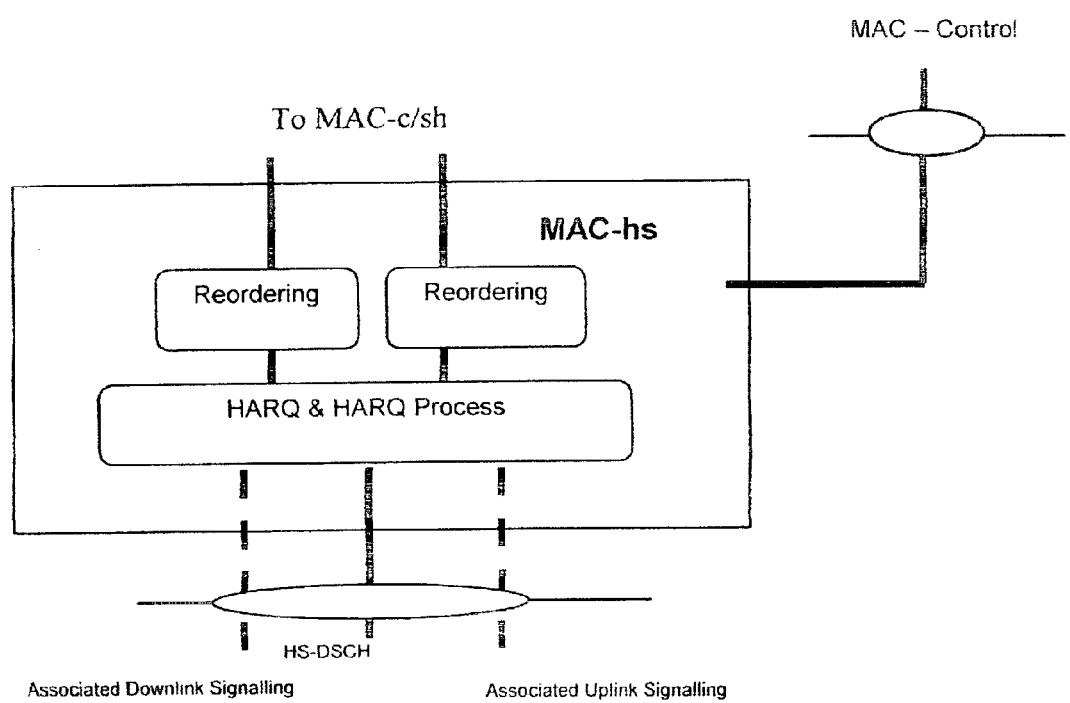

The invention modifies the timer based stall avoidance mechanism of the prior art to fix its inherited weaknesses. Besides only using timer to monitor the missing date blocks in the reordering buffers at the receiver, this invention will utilize a plurality of timers in the transmitter to monitor its transmitting data blocks. The transmitter activates one corresponding timer for each sending data block that has a new TSN. When the transmitter receives an acknowledgment for the sent data block from the receiver, the corresponding timer for the sent data block at the transmitter is stopped. Otherwise, if the timer expires before the transmitter receiving such corresponding acknowledgment for the sent data block, the transmitter discards the corresponding data block from the retransmission buffer and will not retransmit it again. The duration of the timers in the transmitter are preferred to be configured the same as or shorter than the duration of these timers used by the reordering buffers at the receiver.

Overall, the new timers at the transmitter perform several functions. First, because the transmitter will not retransmit the data block once its corresponding timer expires, the receiver will no longer wait indefinitely for a particular missing data block with new TSN. Moreover, with the new timers installed at the transmitter, the transmitter will not waste the system resource by sending out data blocks, which will be discarded by the receiver. Second, this invention provides a positive feedback mechanism between the receiver and the transmitter. Therefore, the transmitter waits a predetermined responding time for each return acknowledgement from the receiver. The limited waiting time constrain will help the transmitter to avoid its own stall situation.

Meantime, the receiver, instead of running one timer at a given time for all different priority-class reordering buffers, can use multi timers to manage the reordering buffers. After all, independent timers bring the multitasking capacity to the management of the reordering buffers. For instance, the invention assigns each reordering buffer with its own timer, while one timer is running for waiting a missing data block in a particular reordering buffer, another reordering buffer delivers its data blocks to upper layer because its monitoring timer is expired. Each reordering buffer proceeds its own delivery and discarding data blocks concurrently and independently. The performance of a multi-timer managed reordering buffers is more efficient than one-timer one does.

In addition, another alternative way to manage the reordering buffers is to use multi timers mechanism at the receiver. The receiver will activate (start) a corresponding timer whenever a missing data block is found. As shown in FIG. 3, with this modifications, this particular reordering buffer will have 4 separate timers to monitor the four missing data blocks, 0, 1, 2 and 7 respectively. When the missing data block is received while its corresponding timer is running, the corresponding timer is stopped. Otherwise, when the timer expires before the data block is received, the missing data block is discarded/removed from the reordering buffer.

This one timer per missing data block mechanism can be further expanded. The basic principle is using one timer for each missing data block, however, if a plurality of missing data blocks are consecutively connected, these consecutive missing data block as one group can be monitored by one timer. Therefore, in this mechanism a timer is activated (started) whenever a gap, which may contain one or several missing data blocks of consecutive Transmission Sequence Numbers (TSNs), is found.

Nevertheless, the gap shall not be contained in a previous gap that has activated a timer before. As shown in FIG. 3, the first gap includes three consecutive missing blocks 0, 1 and 2. Timer T1 is assigned to this first gap. The second gap has only one data block TSN=7 and timer T2 is assigned to the second gap. If TSN=1 is received later, the newly formed gap of TSN=0 will not activate another timer, because TSN=0 is contained in the "previous gap" of TSN=0,1,2, which has activated timer T1. Similarly, the newly formed gap of TSN=2 will not activate another timer either. Of course, when all the missing data blocks in the gap are received while the timer is running, the timer is stopped. Finally, when the timer expires, the data blocks that are still missing in the gap are discarded/removed from the reordering buffer.

What is claimed is:

1. A timer based method to avoid stall of in-sequence delivery of reordering buffers at a receiver in a high speed downlink packet access (HSDPA) of a wireless communication system, where a transmission sequence number (TSN) is assigned to each new data blocks, while the receiver being capable of providing priority in-sequence received data blocks delivery by temporarily storing correctly received data blocks based on their priority class and in order of their TSN at reordering buffers before delivering them to upper layers, the method comprising:

at the receiver:

receiving a data block with assigned TSN;

storing a correctly received data block into one of the reordering buffers based on the data block's priority class and the order of its TSN;

initializing at least one timer running for a predetermined period of time for a reordering buffer when a received data block (TSN=X) cannot be delivered to an upper layer due to at least one data block with a lower TSN (TSN<X) in the reordering buffer being missed;

stopping the timer if the data block (TSN=X) can be delivered to the upper layer due to all the data blocks having lower TSN (TSN<X) in the reordering buffer being received; and when the timer has expired, removing at least one missing data block from the reordering buffer;

wherein initializing at least one timer for a reordering buffer is initializing one timer for the reordering buffer and when the timer has expired, removing at least one missing data blocks from the reordering buffer further comprising delivering received data blocks (TSN<=X-1) of the particular reordering buffer to the upper layer; and removing all missing data blocks (TSN<X) from the reordering buffer.

2. The method of claim 1, wherein initializing at least one timer for a reordering buffer is initializing one timer for each missing data block in the reordering buffer and when the timer has expired, removing at least one missing data blocks from the reordering buffer further comprising of removing the timer-monitored missing data block from the reordering buffer.

3. The method of claim 2, wherein initializing one timer for each missing data block in reordering buffer further comprising of using one timer to monitor a missing gap having a plurality of missing data blocks with consecutive TSNs, while the missing data blocks are not removed from the reordering buffer, no other timer will be assigned to any missing data blocks within the missing gap; and when the timer expired, removing at least one missing data blocks from the reordering buffer is to remove the timer-monitored missing data block(s) from the reordering buffer.

4. The method of claim 1, wherein initializing at least one timer running for a predetermined period of time for a reordering buffer further comprising of the steps of:

receiving a configuration time from the transmitter; and setting the predetermined period of time equal or greater than the received configuration time.

5. A receiver having timer based means for avoiding stall of in-sequence delivery of reordering buffers at a receiver in a high speed downlink packet access (HSDPA) of a wireless communication system, a transmission sequence number (TSN) being assigned to each new data block, the receiver having the capacity of providing priority in-sequence received data blocks delivery by temporarily storing correctly received data blocks based on their priority class and in order of their TSN at the reordering buffers before delivering them to upper layers, and the receiver comprising:

means for receiving a data block with assigned TSN;

means for storing a correctly received data block into one of the reordering buffers based on the data block's priority class and the order of its TSN;

means for initializing at least one timer running for a predetermined period of time for a reordering buffer when a received data block (TSN=X) cannot be delivered to an upper layer due to at least one data block having lower TSN (TSN<X) in the reordering buffer being missed;

means for stopping the timer if the data block (TSN=X) can be delivered to the upper layer due to all the data blocks having lower TSN (TSN<X) in the reordering buffer being received; and when the timer has expired, means for removing at least one missing data block from the reordering buffer;

wherein the means for initializing at least one timer for a reordering buffer is initializing one timer for the reordering buffer and when the timer has expired, the means for removing at least one missing data blocks from the reordering buffer further including means for delivering received data blocks (TSN<=X-1) of the particular reordering buffer to the upper layers; and means for removing all missing data blocks (TSN<X) from the reordering buffer.

6. The receiver of claim 5, wherein means for initializing at least one timer for a reordering buffer is means for initializing one timer for each missing data block in the reordering buffer and when the timer has expired, means for removing at least one missing data blocks from the reordering buffer further comprising means for removing the timer-monitored missing data block from the reordering buffer.

7. The receiver of claim 6, wherein means for initializing one timer for each missing data block in a reordering buffer further comprising means for using one timer to monitor a missing gap having a plurality of missing data blocks with consecutive TSNs, while the missing data blocks are not removed from the reordering buffer, no other timer will be assigned to any missing data blocks within the missing gap; and when the timer has expired, means for removing at least one missing data blocks from the reordering buffer further comprising means for removing the timer-monitored missing data block(s) from the reordering buffer.

8. The receiver of claim 5, wherein means for initializing at least one timer running for a predetermined period of time for a reordering buffer further comprising:

means for receiving a configuration time from the transmitter; and means for setting the predetermined period of time equal or greater than the received configuration time.

* * * * *

INTER PARTES REEXAMINATION CERTIFICATE (1122nd)
United States Patent
Jiang

(10) Number: US 7,436,795 C1
(45) Certificate Issued: Jun. 3, 2015

(54) TIMER BASED STALL AVOIDANCE MECHANISM FOR HIGH SPEED WIRELESS COMMUNICATION SYSTEM

(75) Inventor: Sam Shiaw-Shiang Jiang, Hsinchu (TW)

(73) Assignee: INNOVATIVE SONIC LIMITED, Offshore Incorporations Centre Road Town, Tortola (VG)

Reexamination Request:
No. 95/002,153, Sep. 7, 2012

Reexamination Certificate for:
Patent No.: 7,436,795
Issued: Oct. 14, 2008
Appl. No.: 10/314,539
Filed: Dec. 9, 2002

Related U.S. Application Data

(60) Provisional application No. 60/345,676, filed on Jan. 3, 2002.

(51) Int. Cl.
*H04W 4/00* (2009.01)
*H04L 1/18* (2006.01)
*H04L 29/06* (2006.01)
*H04L 12/801* (2013.01)

(52) U.S. Cl.
CPC .............. *H04L 1/1841* (2013.01); *H04L 69/28* (2013.01); *H04L 1/1848* (2013.01); *H04L 1/1851* (2013.01); *H04L 1/1812* (2013.01); *H04L 47/10* (2013.01); *H04L 1/1883* (2013.01)

(58) Field of Classification Search
None
See application file for complete search history.

(56) References Cited

To view the complete listing of prior art documents cited during the proceeding for Reexamination Control Number 95/002,153, please refer to the USPTO's public Patent Application Information Retrieval (PAIR) system under the Display References tab.

*Primary Examiner* — Matthew Heneghan

(57) ABSTRACT

This invention uses timers at the transmitter to track its sending data blocks to improve the timer-based stall avoidance mechanism of the prior art, Moreover, the invention uses a multi-timer mechanism to manage reordering buffers at the receiver. The multi-timer mechanism provides the receiver with one timer per reorder buffer, or uses one timer per missing data block, or uses one timer per missing data block but a gap of consecutive TSN missing data blocks can share one timer. The multi-timer mechanism can effectively track the missing blocks and monitor the reorder delivery process for all reordering buffers.

---

At the time of issuance and publication of this certificate, the patent remains subject to pending reissue application number 14/517,230 filed Oct. 17, 2014. The claim content of the patent may be subsequently revised if a reissue patent is issued from the reissue application.

| TSN | 0 | 1 | 2 | 3 | 4 | 5 | 6 | 7 | 8 |
|---|---|---|---|---|---|---|---|---|---|
| Receiving status | X | X | X | V | V | V | V | X | V |

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*